Inventor
Frederick C. Ramsing
By Bacon & Thomas
Attorneys

UNITED STATES PATENT OFFICE 2,530,077

METALLURGICAL FURNACE

Frederick C. Ramsing, Phoenix, Ariz.

Application February 11, 1948, Serial No. 7,624

1 Claim. (Cl. 266—24)

This invention relates to a metallurgical furnace and more particularly, to a furnace for roasting and calcining finely divided materials in a vortex of burning gases and heated products of combustion.

The furnace of the present invention has utility in the pretreatment of ores, burning of limestone, etc., wherever it is desired to employ heat to disassociate or change the nature of chemical compounds in raw materials while retaining such materials in solid form. In general, the furnace of the present invention includes a furnace chamber which is circular in cross-section and positioned so as to have a vertical axis. The furnace has its largest diameter adjacent its upper portion and tapers downwardly to a discharge conduit for the treated materials. Fuel is injected tangentially into the furnace chamber near the top thereof along with a blast of air or oxygen to support combustion and the resulting flame and products of combustion first spiral downwardly near the walls of the furnace chamber and then upwardly in the central portion of the furnace chamber and are exhausted through a flue or discharge opening centrally disposed in the top of the furnace chamber. This produces a double or compound vortex of flame and products of combustion made up of a descending outer vortex and an inner ascending vortex. Flame and highly heated products of combustion thus make a plurality of passes around the furnace chamber adjacent the walls thereof and heat such wall to a high temperature.

Finely divided ore or other material to be roasted or calcined is also delivered tangentially into the furnace chamber, preferably adjacent the point of fuel feed, the finely divided material preferably being carried by a stream of gas or air. The particles come into direct contact with the flame and spiral downwardly in the outer vortex along the heated walls of the furnace chamber. Heat is imparted to the particles by contact with the flame and heated products of combustion of the outer spiral and by radiation of heat from the furnace walls as well as by contact with the heated furnace walls. Disassociation of the compounds of the powdered material being treated or oxidation or reduction reactions can be rapidly carried out. At the lower portion of the outer vortex the heated products of combustion as well as any gas or vapor liberated during the roasting or calcining operation move inwardly into the ascending inner vortex. Any roasted or calcined particles still remaining in the vortex are thrown therefrom and the gases and vapors move upwardly in the inner spiral to be discharged through the flue or discharge opening. The treated particles move downwardly and collect in the lower portion of the furnace chamber and may be withdrawn therefrom either continuously or intermittently. The lower portion of the furnace is, in general, at a lower temperature than the upper portion so that the particles partially cool before being discharged. A stream of air or gas of the correct composition is preferably blown upwardly through the particles collecting in the lower portion of the furnace to prevent any reversal of chemical reactions due to continued contact between the treated particles with the gases in the furnace at such lower temperature. The entire process is rapid and continuous since the small size of the particles supplied to the furnace enables them to be rapidly heated throughout. The process is subject to more accurate control than prior processes and may be carried on at less expense both as to first cost and as to operating costs.

It is therefore an object of the present invention to provide an improved metallurgical furnace for continuously roasting or calcining finely divided material.

Another object of the invention is to provide an improved furnace in which a spiral path of flame and heated products of combustion is produced and finely divided material to be roasted or calcined is injected into the spiral to be carried therewith and later separated from the spiral.

Another object of the invention is to provide a roasting or calcining furnace in which finely divided material to be calcined is heated by direct contact with flame and heated products of combustion in a downwardly spiralling vortex as well as by direct contact with heated furnace walls and by heat radiated from such walls.

Another object of the invention is to provide a roasting or calcining furnace in which finely divided particles are heated to a disassociation temperature by heat from a vortex of flame and heated products of combustion and are then blanketed with a suitable gas to prevent reverse reaction when discharged from the area of greatest heat.

A further object of the invention is to provide an improved furnace for roasting or calcining ores or other material in which particles of the material being treated are carried in a vortex of flame and heated products of combustion.

A still further object of the invention is to provide an improved roasting or calcining furnace in which particles being treated are heated while suspended in a vortex of flame and heated products of combustion and reverse reactions are prevented when the particles are discharged from the vortex.

Other objects and advantages of the invention will appear in the following description of a preferred embodiment thereof shown in the attached drawing, of which:

Figure 1:
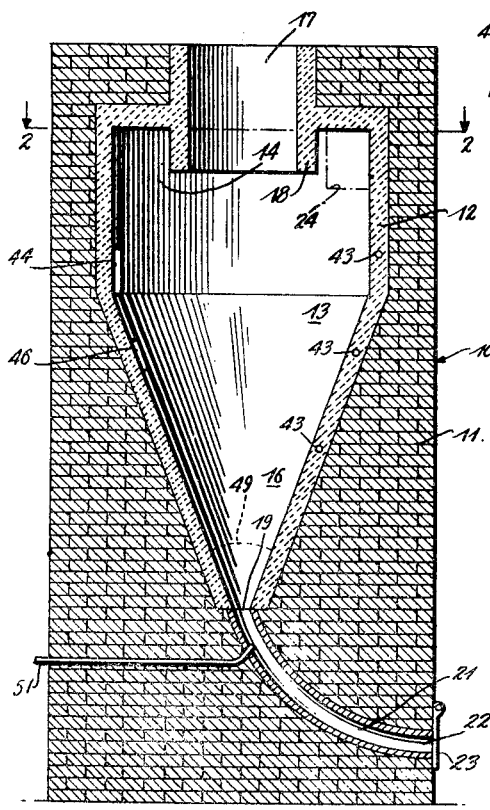
Fig. 1 is a vertical section through a furnace in accordance with the present invention taken on the line 1—1 of Fig. 2.

Referring more particularly to the drawing, the furnace 10 of the present invention may be circular in horizontal cross-section and may have its outer wall portions 11 constructed of any suitable heat insulating structural material, for example, the brick work shown. The heat insulating material 11 may be lined with any suitable refractory material 12 to provide a furnace chamber 13. The furnace chamber will ordinarily be circular in horizontal cross-section and have a portion 14 of greatest diameter adjacent its top portion. The portion 14 may be cylindrical and may be positioned directly above a downwardly converging lower portion 16. The portion 16 is illustrated as being frusto-conical so as to have straight elements in vertical section but such elements may have any desired curvature. The top of the upper portion 14 of the furnace chamber may be provided with a centrally disposed flue or discharge opening 17 having walls of refractory material 12 and preferably the refractory walls extend downwardly a short distance into the furnace chamber, as indicated at 18, to assist in forming the double vortex later described. The lower end of the converging portion 16 of the furnace chamber terminates in a discharge opening 19 communicating with a discharge passage 21 preferably extending downwardly and laterally to a discharge port 22 indicated as being closed by a hinged door 23 for intermittent discharge of the treated material, although any suitable discharge mechanism may be employed for regulating the discharge of treated material from the furnace.

A combustible mixture along with finely divided material to be calcined or roasted may be introduced tangentially into the upper end of the furnace chamber through a tangential opening 24 (Fig. 2) also lined with refractory material. The position of the opening 24 is also indicated by the dot-dash lines in Fig. 1. The combustible mixture may be tangentially directed through the opening 24 by means of a pipe 26 provided with a nozzle 27. The flame produced by ignition of the combustible mixture and the heated products of combustion spiral downwardly adjacent the walls of the furnace chamber through the portion 14 and into the tapered portion 16, thus heating the refractory walls of the furnace. Finely divided material carried in suspension in air or other suitable gas may likewise be tangentially injected into the furnace through the opening 24 by means of a pipe 28 provided with a nozzle 29. The finely divided material in suspension in gas thus preferably enters the furnace between the flame and the furnace wall but comes into direct contact with flame and heated products of combustion to spiral downwardly therewith along the furnace walls. The remainder of the opening 24 around the nozzles 27 and 29 may be filled with a clay plug indicated at 31, the discharge ends of the nozzles preferably being positioned a substantial distance back in the opening 24 from the furnace chamber 13 so as to be partly protected from the heat in the furnace chamber.

The blast for delivering both the fuel mixture and the suspension of finely divided material into the furnace may be produced by a blower indicated at 32, which blower may be driven from any suitable source of power, for example, through pulley 33. In the embodiment shown, air may be employed both for introducing the material to be calcined or roasted and for admixture with the fuel. Thus, the pipe 26 leading from the blower 32 may have a valve 34 therein for regulating the amount of air for admixture with the fuel and fuel may be introduced into the pipe 26 through a pipe 36 also provided with a regulating valve 37. The preferred fuel is in inflammable gas such as natural gas, or manufactured gas, but it will be apparent that other fuel such as liquid or finely divided powdered fuel may be employed.

The pipe 28 for introducing the finely divided material to be roasted or calcined may likewise be connected to the blower 32 and provided with a regulating valve 38. Finely divided material to be treated may be introduced into the pipe 28 in any suitable manner, for example, by means of a screw conveyor 39 leading from the lower portion of a hopper 41 and having a casing 42 communicating with the pipe 28. Such a screw conveyor may be employed to deliver regulated amounts of finely divided material into the pipe 28 and thus produce a suspension of finely divided material in an air blast, although any other type of proportioning device suitable for handling powdered material may be employed.

Figure 3:
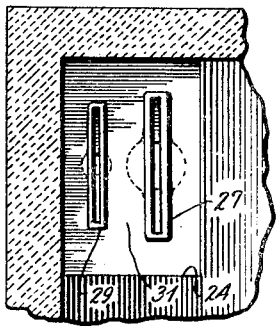
Fig. 3 is a fragmentary interior elevation of a portion of the furnace showing the ends of the nozzles for injecting fuel and material to be treated.

As shown in Fig. 3, the nozzles 27 and 29 preferably terminate in flattened portions in which the openings have a substantially greater vertical dimension than horizontal dimension. The nozzle 27 provides a flattened or ribbon-like flame which is parallel to the furnace walls and spirals downwardly in the furnace chamber making a plurality of passes around the furnace chamber to substantially uniformly heat the walls of the furnace chamber. Likewise, the nozzle 29 provides a flattened stream of particles suspended in a suitable gas between the flame and the walls of the furnace. Both of these streams, however, diverge laterally from the nozzles and merge within the furnace chamber so that the particles are subjected to direct contact with the flame and heated products of combustion as well as heat radiated from the walls of the furnace chamber. If air is employed to carry the particles, the stream of suspended particles also supplies secondary air for the flame, but it is apparent that an inert or reducing gas can be employed to carry the particles if a neutral or reducing atmosphere is required in the particular roasting or calcining process being carried out.

The temperature of the refractory lining of the furnace chamber may be determined by any suitable temperature responsive elements, for example, a plurality of thermocouples embedded in the refractory walls as indicated at 43. The temperature of the furnace walls is closely correlated with the actual temperature within the furnace in any given process and may be employed to control the nature and amount of the combustible mixture as well as the feed of finely divided material to be roasted or calcined to thereby control the temperature of the furnace chamber.

The downwardly spiralling combined stream of heated products of combustion and particles being treated moves inwardly in the upper part of the converging portion 16 of the furnace chamber. The treated particles are thrown from the outer vortex and continue down the side walls of the furnace and collect in the lower end of the portion 16. The products of combustion then spiral upwardly in an inner vortex and are exhausted through the flue portion 17. The downwardly projecting portions 18 of the walls of the discharge flue 17 assist in maintaining the double vortex referred to by directing the entering gases downwardly.

Figure 2:
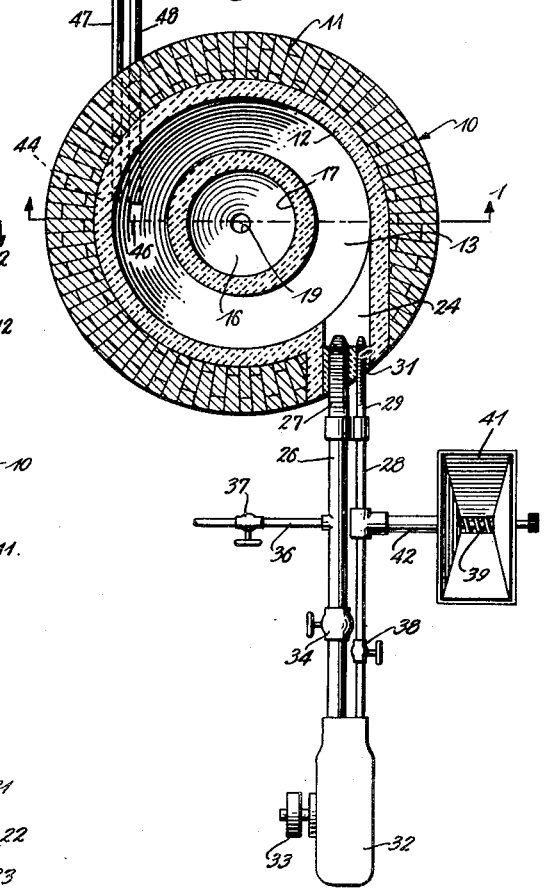
Fig. 2 is a horizontal section taken on the line 2—2 of Fig. 1.

Additional oxidizing or reducing gases may be introduced into the upper spiral if necessary or desirable in a particular roasting or calcining operation through one or more tangential ducts 44 and 46 which may be connected to suitable pipes 47 and 48, respectively, shown in Fig. 2. The ducts 44 and 46 preferably enter the furnace chamber intermediate its height in a tangential direction so as to direct the additional gases in the same direction as the gases in the outer vortex. In general, the ducts 44 and 46 should be positioned so that any additional gases are introduced into the vortex after combustion of the original combustible mixture is substantially complete. In this connection, it is to be noted that in roasting operations on sulfide ores which are high in sulfur the reaction after once being started may continue without the addition of further fuel or with the addition of a small amount only of fuel other than the sulfur. That is to say, the sulfur content of the ore constitutes at least the major portion of the fuel and the combustible mixture is made up largely of the finely divided ore suspended in air or oxygen.

In operation of the furnace, it is desirable in many cases to allow a small amount of treated material to accumulate in the lower part of the converging portion 16 of the furnace as indicated by the dotted line 49. The treated particles in the lower portion of the accumulated material tend to cool while in contact with the furnace gases and in many operations, a reverse chemical reaction tends to take place. For example, in the calcining of limestone to lime, such particles can recombine with carbon dioxide or in reducing operations the particles can again partially oxidize. This can be prevented in the present furnace by introducing a small amount of a suitable gas through a pipe 51 into the discharge passage 21 just below the furnace chamber so that such gas moves upwardly through the pile of accumulated material to remove the furnace gases from contact with the particles. In the case of calcining of limestone or in oxidizing operations in general, the gas introduced can be atmospheric air and in a reducing operation the gas may be hydrogen, carbon monoxide or other reducing gas.

Alternatively, it is many times possible to operate the lower portion of the furnace at a temperature above the recombination temperature, in which case it is possible to intermittently discharge the treated material directly into the atmosphere in the case of oxidizing or calcining operations. This may be accomplished, for example, by a gate or valve positioned at the discharge opening 19 from the furnace chamber. This completely removes the treated material from contact with reaction gases from the furnace chamber during cooling of the treated material and eliminates any possibility of recombination.

The furnace of the present invention is adaptable to a large number of metallurgical purposes, such as the roasting of ores or the calcining of various materials. Thus, various sulphide ores such as those of copper, lead and nickel may be roasted to remove at least a portion of the sulfur, such roasting ordinarily being carried on in an oxidizing atmosphere. Carbonate ores may be roasted to convert them to oxide ores, also in an oxidizing atmosphere and such material as limestone or dolomite may be calcined to produce lime. By employing a reducing atmosphere, it is possible to partly or completely reduce oxide ores, such as iron or nickel ores, or to reduce purified oxides of such materials as copper, nickel, iron, etc., in the production of pure metals, catalysts, etc., the reduced material being recovered in solid particle form. In such operations, a reducing flame may be employed and additional reducing gas introduced into the furnace as the medium for suspending the particles, or through the auxiliary ducts 44 and 46 or both. To prevent lowering the temperature in the furnace any gases introduced through the auxiliary ducts 44 and 46 should preferably be in a highly heated condition, that is, they should have a temperature approaching the furnace temperature.

In order to prevent substantial amounts of treated particles from being carried out with the exhaust gases, flue portion 17 in the furnace chamber should be substantially smaller than the main portion. In most cases, the diameter of the flue portion should be approximately one-half of the greatest diameter of the furnace, i. e., the flue portion 17 should have an area approximately one-quarter of that of the portion 14 of the furnace chamber, although the exact ratio of the diameter of the flue portion and the diameter of the main furnace chamber will vary somewhat depending upon the particular roasting or calcining operation being carried out in the furnace. This ratio of the diameter of the flue portion to the diameter of the main chamber of the furnace may thus vary from approximately one-third to two-thirds. The ratio of vertical height to diameter of the main portion 14 will also vary depending upon the size of the furnace and the process carried out therein, but will usually fall between approximately .3 and 1 while the ratio of height to greatest diameter of the converging portion 16 will usually fall between approximately 1 and 1.5.

The particle size of the material to be calcined or roasted may vary over a considerable range depending upon the particular operation being carried out and the size of the furnace. For example, the particle size may range between approximately 200 mesh to particles averaging ⅛" in diameter. The smaller sized particles in the range mentioned above are preferred in most cases since the smaller the particle size the more rapid the heating of the particles. Particles as small as 10 microns can be satisfactorily separated in the furnace from the gases leaving the furnace, but in general, the cost of producing such small sized particles overbalances any advantages obtained unless the material to be treated is already in such a fine stage of division.

The gases entering the furnace, both in admixture with fuel and in admixture with the particles to be calcined or roasted need not be under excessive pressure. In general, the pressure required to form the blast is approximately 8" of water, i. e., from approximately 6" to 10" of water. Burning of the gases causes substantial expansion of the gases so that high velocity is obtained in the vortex. Heat is rapidly extracted from the flame and products of combustion by the particles being treated so that the expansion of the gases is approximately four times the volume of the entering gases, and ordinarily the gases will be discharged through the flue portion 17 of the furnace at approximately one-half the pressure of the entering gases.

In starting up the furnace, the mixture of fuel and air or other combustion supporting gas is first introduced and burned until the interior furnace walls reach the desired temperature. This temperature will, of course, vary with the nature of the material being roasted or calcined and will ordinarily be slightly above the temperature required for the disassociation or other reaction taking place. That is to say, the "heat lead" of the furnace is small since the small size of the particles and the efficient contact thereof with heated gases as well as the efficient radiation of heat from the furnace walls causes the particles to be rapidly heated even though the average temperature in the furnace is only slightly above the required temperature of the particles. Thermocouples or other temperature responsive elements in the refractory walls may be employed to determine when the furnace is up to heat. When the desired temperature has been obtained, feed of the finely divided material to be treated is started. While the preferred manner of feeding the particles is to employ a separate nozzle and a separate stream of suspending gas for the particles, it is possible to suspend the particles in the combustible mixture. Thus the particles to be calcined or roasted may be delivered into the stream of air or oxygen employed to support combustion before or after admixture with fuel or may be delivered into a stream of gaseous fuel or admixed with powdered fuel before admixture with the air or oxygen, so that the particles to be roasted or calcined are fed directly into the flame of the combustible mixture. By adjustment of the amount of fuel introduced in accordance with the temperature indicated by the thermocouples, the required temperature for a given operation may be easily maintained.

The absorption of heat by the material being treated per unit of time per unit of feed is a major factor enabling the "heat lead" of the furnace of the present invention to be held at a minimum value. That is to say, the small sized particles being treated and the fact that they are fed directly into the flame enables the heat of the flame to be maintained at a temperature just above the temperature which must be imparted to the particles for the particular calcining or roasting operation being carried on. By way of illustration, a particle having a diameter of .01 inch will be heated to a given temperature when exposed to a given flame temperature in approximately $1/10,000$ of the time required to heat to the same temperature a similarly shaped particle having a one inch diameter. The small particles absorb heat from the flame with sufficient rapidity to reach a roasting or calcining temperature almost instantaneously, and as the small particles are distributed throughout the flame, the feed of such particles can be balanced against the flame heat to neutralize excess flame temperatures almost instantaneously. For example, the fuel-air combustion temperature of a particular fuel mixture may be 3000° F., while the desired roasting or calcining temperature of the material being treated may be 1700° F., giving an "over temperature" or "heat lead" of 1300° F. By employing the small particle feed of the present invention and introducing the feed directly into the flame, the actual temperature of the flame may be reduced, for example, to 1900° F., producing a "heat lead" of 200° F. only. The lower flame temperature not only reduces heat losses but also materially lessens deterioration of the refractory furnace walls.

From the above description, it will be apparent that I have provided a simple apparatus by which a wide variety of ores may be rapidly and continuously roasted or by which various materials may be calcined.

While I have disclosed the preferred embodiment of my invention, it is to be understood that the details thereof may be varied within the scope of the following claim:

Metallurgical apparatus for heating particles of solid material comprising, a furnace structure having a furnace chamber positioned to have a substantially vertical axis, said furnace chamber being substantially circular in horizontal cross-section and having its walls lined with refractory material, said furnace chamber having a main portion of greatest diameter adjacent its upper end and having a flue portion of substantially smaller diameter than said main portion communicating centrally with the upper end of said main portion, said furnace chamber also having a downwardly converging portion below said main portion terminating at its lower end in a restricted discharge passage, means for directing a stream of combustible material tangentially into the upper part of said main portion to provide for the production of an outer downwardly spiralling vortex of flame and heated products of combustion heating the walls of said furnace and an inner upwardly spiralling vortex of products of combustion discharging through said flue portion, means for simultaneously directing a stream of particles to be treated tangentially into the upper part of said main portion so that said particles spiral downwardly in said outer vortex adjacent said heated walls and collect in said lower portion of said furnace for removal through said discharge passage, and means for directing a stream of gas upwardly through the particles collected in said restricted discharge passage.

FREDERICK C. RAMSING.

REFERENCES CITED

The following references are of record in the file of this patent:

UNITED STATES PATENTS

| Number | Name | Date |
|---|---|---|
| 729,008 | Sutton et al. | May 26, 1903 |
| 729,009 | Sutton et al. | May 26, 1903 |
| 817,414 | Brown | Apr. 10, 1906 |
| 920,333 | Hughes | May 4, 1909 |
| 1,941,592 | Bacon et al. | Jan. 2, 1934 |
| 2,063,401 | Rossman | Dec. 8, 1936 |
| 2,065,566 | Curtis | Dec. 29, 1936 |
| 2,086,201 | Zeisberg | July 6, 1937 |
| 2,095,183 | Dyckerhoff | Oct. 5, 1937 |
| 2,165,084 | Wendeborn | July 4, 1939 |
| 2,184,300 | Hodson et al. | Dec. 26, 1939 |
| 2,306,462 | Moorman | Dec. 29, 1942 |